May 10, 1932.    F. MAY    1,858,164
HIGH PRESSURE VALVE
Filed Feb. 12, 1930    2 Sheets-Sheet 2
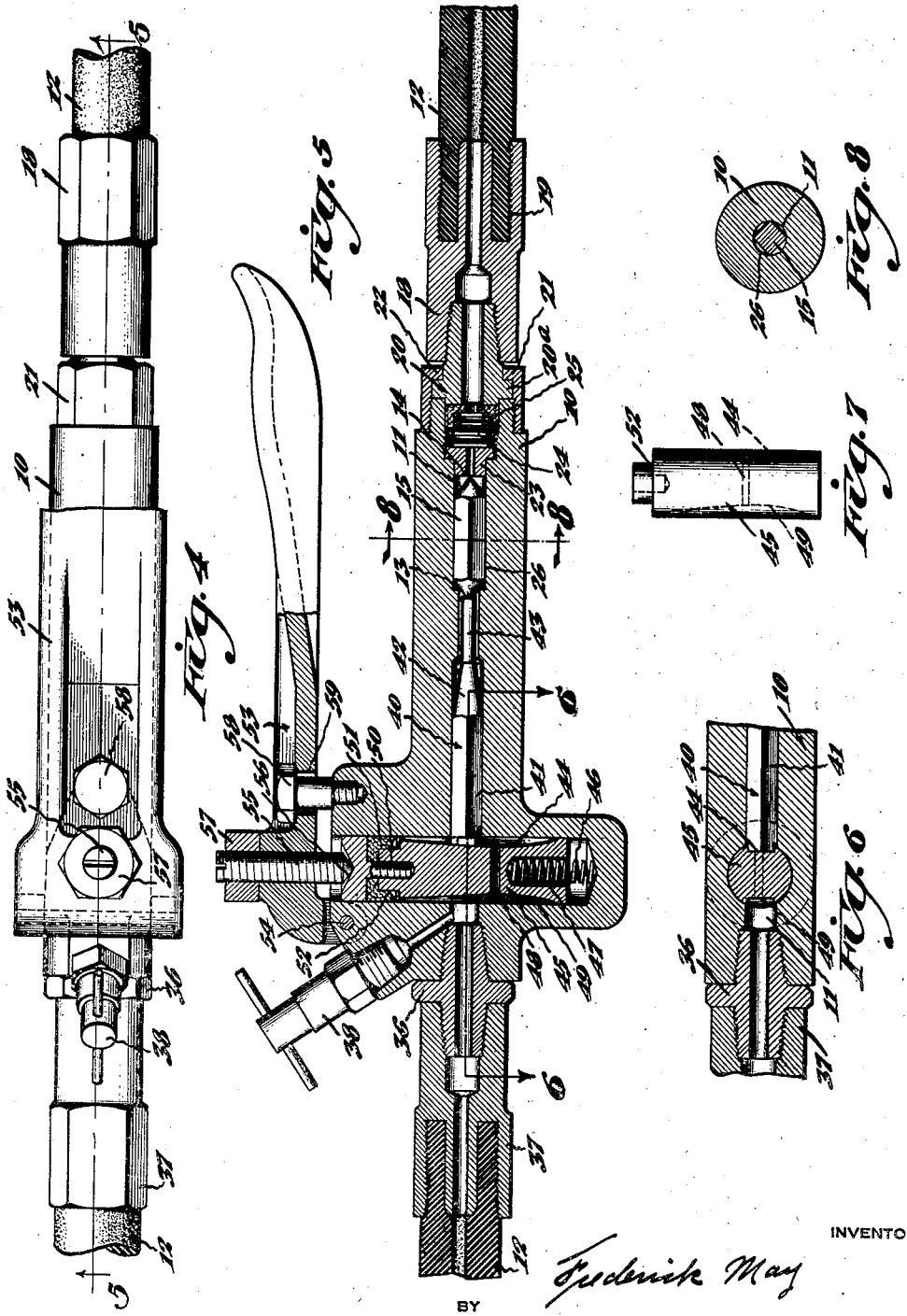

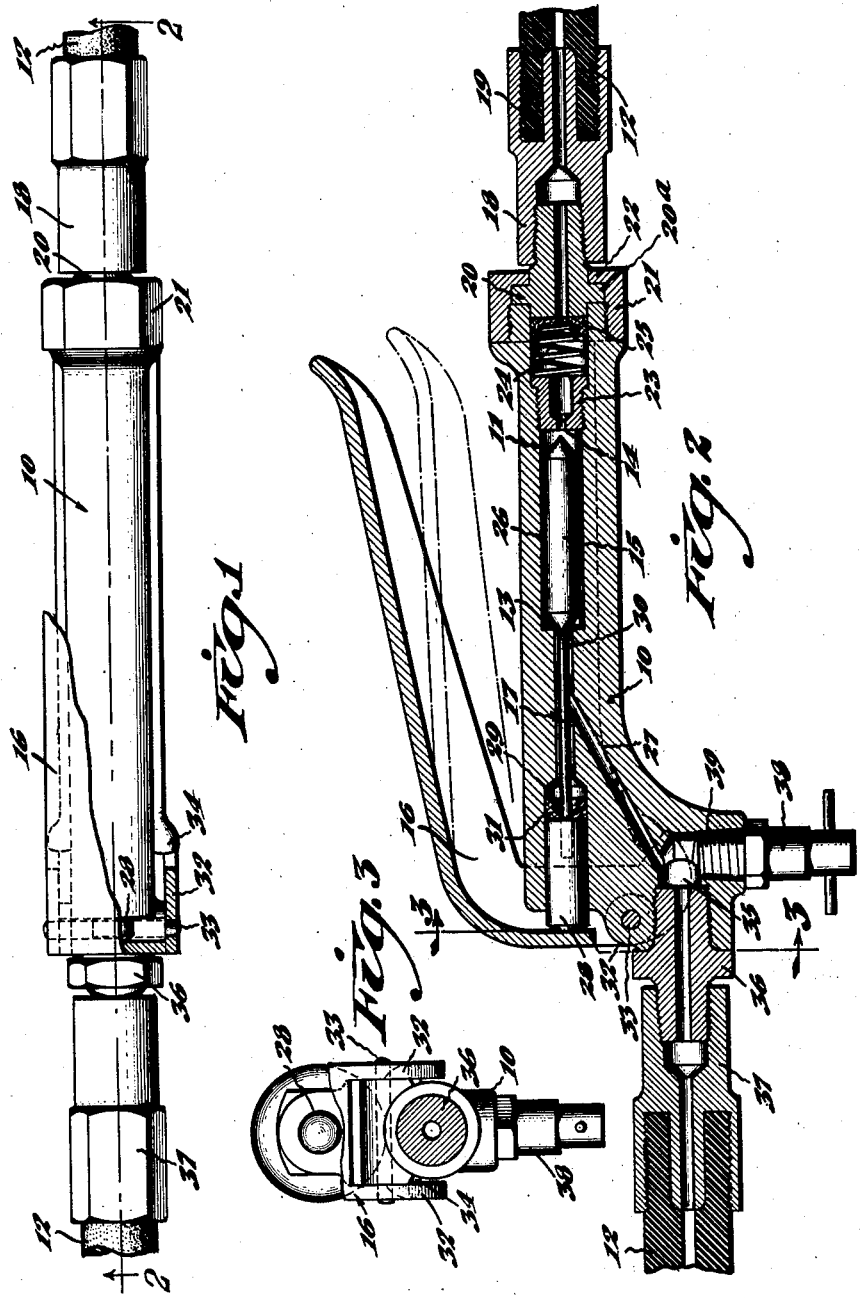

Patented May 10, 1932

1,858,164

UNITED STATES PATENT OFFICE

FREDERICK MAY, OF CINCINNATI, OHIO, ASSIGNOR TO THE CINCINNATI BALL CRANK COMPANY, OF CINCINNATI, OHIO, A CORPORATION OF OHIO

HIGH-PRESSURE VALVE

Application filed February 12, 1930. Serial No. 427,796.

This invention relates to high-pressure lubrication and is particularly directed to an improved valve for use in a high-pressure lubricant discharge line for supplying the lubricant to the various parts of a machine such as an automobile. The lubricant, as is well known in this art, must be supplied to the fittings and parts to be lubricated at pressures ranging from 2000 to 5000 pounds per square inch in order to efficiently lubricate. The bearings or parts to be lubricated are quite often "choked" or "frozen", and are extremely difficult to lubricate and for this reason a high-pressure discharge of lubricant is necessary to break any stoppage in the fitting or bearing. The introduction of the lubricant is usually accomplished by what is termed a high-pressure shot of lubricant.

The valve of this invention is applied or interposed in a grease discharge line which has a high-pressure head extending through the line to the valve, this pressure being provided by means of a high-pressure pumping unit. The valve is designed to control the lubricant flow from the high-pressure head to a fitting or part to be supplied with lubricant. It will be understood that the valve is designed for use in controlling the high-pressure dispensation of either relatively heavy oil or grease.

It will be recognized that it is possible to slightly compress standard grease inasmuch as there is a slight quantity of air present in the grease so that a line pressure is actually built up and a pressure head maintained in the valve which of course is rapidly decreased upon each shot of grease. A steady flow of grease lowers the pressure in comparatively little time and it is necessary to either initiate pumping activity for rebuilding the supply pressure in the line or to provide a constantly operating pump by passing at the required maximum pressure, the pressure supply means depending on the nature of the lubricant being supplied. The pressure building means is immaterial to the present invention and is not disclosed herein.

It is the object of this invention to provide a valve for high-pressure duty which is quickly, easily and accurately manipulated to release a shot or impulse of lubricant under full line high-pressure from the extremely high-pressure head at the supply side of the valve for a direct application to a fitting. For this result a shuttle valve element is disposed between opposing valve seats and is normally held seated on one of these seats by a high-pressure at the supply side of the valve and is unseated for high-pressure grease release by a hand control and moved to the opposing seat whereby a governed grease flow or shot passes through during the interlude represented by the movement of the valve from seat to seat.

The actuating or valve translating means is designed for high speed transfer or translation of the valve element from seat to seat since the grease under pressures such as 4000 pounds per square inch passes through the passageway after the manner of a shot and the line may only be opened a fraction of a second, otherwise an overdischarge results.

It is another object of this invention to provide a high-pressure flow control valve of this nature in which the valve element may be accurately moved to release a shot of grease or to permit steady flow if desired. The latter function is achieved by a partial movement of the control means disposing the control valve element in a position intermediate of the valve seats.

It is also an object of this invention to provide a hand lever and actuating medium for controlling the positioning of the valve which imparts a delicate movement thereto and permits a relatively long stroke for the gripped or actuated end of the handle so that only an ordinary amount of care need be used in causing the valve to function in the alternate manners described.

Other objects relate to the general construction of the valve as the features of the actuating medium between the handle and the shuttle valve, the arrangement of the grease passageways, and the assembly features.

Other objects and certain advantages will be more fully set forth in a description of the following drawings in which:

Figure 1 is a top plan view of the valve of the present invention showing it inserted in a high-pressure grease discharge line.

Figure 2 is a sectional view taken on line 2—2, Figure 1, detailing the valve.

Figure 3 is a sectional view taken on line 3—3, Figure 2, illustrating the arrangement of the handle relative to the body of the valve.

Figure 4 is a top plan view of a modified form of valve.

Figure 5 is a sectional view taken on line 5—5, Figure 4, detailing the modified form of valve and illustrating the modifications which relate to the means for translating the shuttle valve.

Figure 6 is a sectional view taken on line 6—6, Figure 5, illustrating the actuating medium between the hand lever and the shuttle valve.

Figure 7 is a view showing the actuating plunger separate and apart from the assembled valve.

Figure 8 is a sectional view taken on line 8—8, Figure 5.

The valve of the nature concerned herein includes a body 10 having a passageway 11 extending through the same, the ends of the passageway respectively connected to adjacent ends of a discharge line 12 formed of high-pressure tubing. The passageway of the valve thus interposed in the grease discharge line provides opposing valve seats 13 and 14 and a shuttle valve element 15 is disposed loosely between the seats being normally urged against one seat 13 by the head pressure in the line and manually unseated to engage upon the opposite seat 14 to allow passage of lubricant during the translation from one seat to the other.

A lever 16 is pivoted on the body for actuating the valve element through the medium of a plunger 17 which plunger is in engagement with the seated end of the valve element and the lever is so arranged as to provide a rapid translation of the valve from seat to seat for a quick shot of lubricant or for maintaining the valve between the seats for a steady flow.

Referring more specifically to the details as shown in the drawings, the body is of the form of a tube having a depending portion for off-setting the passageway toward the forward end thereof. The rear end of the valve body is rotatably connected to the high-pressure tubing 12, the rotatable connection being sealed against leakage and provided for permitting a more facile manipulation of the outer tubing section or the section beyond the valve by rotating the valve relative to the main discharge line. For this connection, a union 18 is provided having a hexagon nut formed on its outer periphery and including a deep annular groove 19, concentric with the axis of the union, and into which groove the heavy rubber and fabric tubing is pressed into position. The tubing used is extremely heavy for carrying high pressures.

The end of the union adjacent the valve is internally threaded and screwed upon a rotatably mounted nipple 20. The nipple provides a concentric annular shoulder 20ª abutting the end of the body and held thereagainst by means of a nut 21, this nut having an inward flange 22 bearing against the annular shoulder of the nipple and maintaining the nipple in position upon the end of the valve body. The shoulder of the nipple, therefore, rotates in a groove formed by the association of the nut and the body of the valve. A portion of the nipple fits within the large bore end of the body. This enlarged bore end of the body contains a valve seat element 23 providing the valve seat 14, this element being screwed into the inner end of the enlarged bore against the shoulder marking the decrease of the bore to the valve chamber. The seat element 23 provides an abutment for a coil spring 24 under compression against a cup gasket 25 for seating the gasket against the rotatable nipple.

The flow of grease is uninterrupted through the central passageway of the nipple through the enlarged bore and thence through a small central bore of the valve seat element into the valve chamber 26. The grease is, therefore, active at all times within the enlarged bore for spreading the cup gasket and efficiently sealing the rotatable nipple connection to the body.

The valve seat element 23, comprises, a head which is engaged in the enlarged bore and a screw threaded portion screwed into the bore forming the valve element chamber 26. The valve element 15 is loosely fitted within the chamber so that grease may pass between the valve and the bore of the chamber when the valve is unseated. This clearance is slightly exaggerated on the drawing to clearly illustrate the grease passageway but will be understood as providing a loose sliding fit.

The active or seating ends of the valve element are formed to provide conical tips, these conical tips seating against sharp edges of the valve seats. The removable valve seat element at one end of the valve chamber provides a straight inner end face and the bore at right angles thereto. The other valve seat 13 is formed by a right angled shoulder at the forward end of the valve chamber constituting a reduction in the passageway beyond the valve chamber.

The bore through the body of the valve continues in axial alignment to the forward end of the body, the continuing bore providing the mounting for the valve actuating medium between the handle 16 and the valve element 15. The grease passageway extends as at 27 obliquely downwardly and forwardly from the bore just forward of the forward or normal valve seat. The valve actuating medium is in the form of the plunger 17 providing a head 28 mounted in a large bore 29 toward the extreme forward end of the body and protruding from the valve for engagement by the handle and a stud extension 30 extending from the head inwardly and engaging against the normally seated end of the valve element.
The stud extends through a bore which is of sufficient clearance diameter to permit grease flow between the stud and the wall of the bore. The grease under high-pressure moves through this bore and enters the inner end of the enlarged bore portion 29 and acts upon a cup gasket 31 engaging against the inner shoulder of the head for sealing the sliding plunger mounting in the valve body.

The handle or lever 16 for actuating the valve element by means of the plunger is pivoted to the body just below the plunger head and relatively close thereto. The handle is of channel form and turns back over the body of the valve sufficiently clear or spaced therefrom to permit downward movement toward the valve body. The operator grasps the valve body and lever in one hand and squeezes the lever inwardly, this providing a conveniently controlled device. The actuated end of the lever is considerable in length as opposed to the distance between the engagement of the plunger by the lever and the pivot. This makes it necessary to move the handle through a considerable range for translating the valve element from seat to seat although the seats are relatively close to the valve and enables the operator to accurately maintain the valve between the seats if he desires.
The channel configuration of the lever which faces inwardly for surrounding the valve body is discontinued just below the contact with the plunger and the respective webs of the lever continued downwardly as at 32 at each side of the valve and are pivoted on a pin 33 extending transversely through the valve body. The extreme lower and rear edges of the webs engage abutments 34 formed integrally with the body at each side thereof for limiting release movement of the lever, the handle, therefore, being maintained in a position of rest between the abutments and the pressure urged plunger when the valve element is in normal seated position.

The obliquely extending grease passageway 27 enters an enlarged bore or tap hole 35 parallel to and below the previously described passageway. A nipple 36 is screwed into the tap hole and a union 37 is screwed onto the outer end of the nipple, the heavy hose 12 being secured in this union in the same manner as the connection previously described at the opposite end of the valve. The nipple 36 in this instance is rigidly secured and the shoulder lies tightly against the inner face of the valve body. A relief or bleeder valve 38 for permitting the release of grease locked under pressure between the closed valve and the fitting is provided screwed into a tap hole 39 communicating with the first mentioned tap hole 35. This relief valve is inserted in the line between the valve and the fitting in order to release the grease under pressure which is trapped between the closed valve and the fitting after an operation since this pressure at times tends to prevent the operator from releasing the coupling (not shown) at the end of the hose from the fitting.
The use of a valve of this type is quite common and has been previously disclosed in this relation so that no further description of this construction and function will be necessary.

In the Figures 4 to 8 inclusive of the drawings, a modified form of device for actuating the valve element is disclosed. The valve disclosed in these views will be identical with the valve previously described with the exception of the construction hereinafter set forth.
It will be noted as shown in Figures 4 and 7, the shuttle valve 15 is formed of square stock sliding in a circular bore or valve chamber, this being another expedient for permitting the flow of grease past the valve when the valve is unseated.

In this instance, two intermediate plungers are used disposed at right angles to each other. The first plunger 40 provides a square elongated head end 41 slidable in the circular grease passageway of the valve for grease passage and having a conical intermediate portion 42 terminating in a straight stud 43 passing freely through a bore and engaging the seated tip of the valve element.
The forward end of this plunger 40, which will be referred to as a translatable plunger, engages in a slot 44 formed in the side wall of a depressible plunger 45 moving through the valve passageway 11 at right angles thereto. This depressible plunger is moved downwardly into a closed bore and is urged upwardly by means of a coil spring 46 compressed between the lower end of the bore and the inner end of a bore 47 in the lower end of the plunger. The groove or slot 44 in which the forward end of the translatable plunger is engaged is inclined upwardly and outwardly so that depression of the plunger translates the plunger 40, which is axially aligned with the grease passageway, for unseating the valve element or for reseating it on the opposing seat.

The grease passes through the bore containing the translatable plunger, and thence moves through the groove 44 and through a cross bore 48 in the depressible plunger below the point of contact of the plungers and thence enters a groove 49 on the diametrically opposite side of the depressible plunger which groove communicates with the continuing passageway of the valve body. These grooves 44 and 49 are identical and extend to the upper end of the depressible plunger. This depressible plunger has a sealed upper or head end to prevent the flow of grease past the same. A specially headed screw 50 secures a downwardly disposed cup gasket 51 on the upper end of the depressible plunger, the upper end of the plunger being grooved as at 52 to receive the cup gasket. The grease under heavy pressure acts through the grooves upon the gasket at all times to urge it against the walls of the plunger bore.

A hand lever 53 is pivoted to the body at one side of the plunger bore on a transversely disposed pin 54, the pivoted end of the lever being of yoke shape to straddle the valve body. An adjustable contact screw 55 is secured through the lever in axial alignment with the depressible plunger. This screw of dog point type, having its dog point engaging a concavity 56 in the upper face of the screw 50, is maintained in said adjusted position by means of a lock nut 57 on its upper end in engagement with the lever. Upward movement of the depressible plunger and lever in engagement therewith is limited by means of a screw 58 engaged in the body at the diametrically opposite side of the plunger bore relative to the pivot, the head of the screw engaging the upper side of the lever and the lever providing a slot 59 traversed by the screw.

The actuated or grasped end of the lever extends out over the body longitudinally therewith and is grasped simultaneously with the body and compressed there against. This type of control lever providing a groove having a gradually inclined bottom in engagement with the translatable valve actuating plunger enables the operator to accurately gauge the actuation of the valve element to either move it the total translatable distance between the seats or to maintain it between the seats.

The grease passageway through the valve body in this instance is straight through and the connection of the outer hose section and the provision of the pressure release valve are identical with the first form.

Having described my invention, I claim:

1. A high-pressure lubricant control valve, comprising, a body having a passageway therethrough, opposing valve seats formed in said passageway, a shuttle valve element loosely mounted for movement between said seats for permitting lubricant flow around said valve element, said valve element adapted to be normally urged against one seat by the grease pressure in the supply end of the valve, a pivoted lever for actuating said valve element to move it from its normal seat, a plunger between said pivoted lever and said valve element, the engagement between said plunger and said lever relatively close to the lever pivot thereby permitting delicate movement of the valve element for maintaining the valve element between the seats or for seating it on the opposing seat for a measured flow of lubricant.

2. A high-pressure lubricant control valve, comprising, a body having a passageway therethrough, opposing seats formed in said passageway, a shuttle valve element slidably mounted between said seats, the relation of valve element and passageway permitting lubricant flow around said valve element, a valve operating plunger disposed in axial alignment with the valve element, said plunger at one end adapted to engage the normally seated end of the valve element, the other end of the said plunger extending exteriorly of the valve body, said passageway extending laterally from the plunger bore, a pivoted lever engaging said other plunger end relatively close to the lever pivot whereby the movement of the lever imparts a delicate movement to the valve element.

3. A high-pressure valve, comprising, a body having a passageway therethrough, opposing valve seats formed in said passageway, a shuttle valve element loosely mounted for movement between said seats, said valve element adapted to be normally seated on one seat by the pressure in the supply end of the valve passageway, a plunger axially aligned with and engaging said valve element, a second plunger mounted transversely to the first plunger and having an inclined wall engaging the end of said first plunger, and means for moving said second plunger to move the first plunger for unseating the valve element either to maintain the same in intermediate position between the seats or to seat the same against the opposite seat.

4. In a valve of the class described, a valve body having a passageway therethrough, opposingly related valve seats formed in said passageway, a valve element slidably mounted between said seats, said valve element adapted to be normally seated on the forward seat by head pressure at the intake end of the valve body, a plunger axially aligned with said valve element and engaging the normally seated end thereof, a second plunger mounted at right angles to the first and having an inclined wall in engagement with the first plunger, a lever pivoted to the body and engaging the upper end of the second plunger for moving said plunger inwardly, a spring normally urging said second plunger outwardly or in a direction to permit normal seating of the valve element, and an abutment engaged by the lever for limiting the outward movement of the second plunger.

5. In a high pressure lubricating control valve, a body having a passageway therethrough, said passageway having opposingly arranged spaced apart seats therein, a valve element of elongated form loosely slidably disposed for movement between said seats, said valve element adapted to be seated normally on one seat by pressure in the intake end of the valve body, a plunger axially aligned with and contacting the normally seated end of said valve element, said valve element, in relation to the bore in which it moves, providing clearance for passage of grease past the same, and means for actuating said plunger.

6. In a high pressure lubricating control valve, a body having a passageway therethrough, said passageway having opposingly disposed valve seats formed therein, a valve element loosely slidably disposed for movement between said seats, said valve element adapted to be seated normally on one seat by pressure in the intake end of the valve body, an actuating element contacting the normally seated end of said valve element and adapted for translating said valve element from its normal seat to the opposing seat, said valve element in relation to the bore in which it moves providing clearance for passage of grease past the valve element, and manipulating means for said actuating element adapted for moving the valve element quickly from one seat to another or for maintaining it at an intermediate position.

In witness whereof, I hereunto subscribe my name.

FREDERICK MAY.